(12) United States Patent
Fenile et al.

(10) Patent No.: US 11,267,658 B2
(45) Date of Patent: Mar. 8, 2022

(54) DEVICE FOR EMPTYING TRANSPORT BAGS CONVEYED IN A SUSPENDED MANNER

(71) Applicant: FERAG AG, Hinwil (CH)

(72) Inventors: Roberto Fenile, Wetzikon (CH); Erwin Stauber, Grüt (CH)

(73) Assignee: FERAG AG, Hinwil (CH)

( * ) Notice: Subject to any disclaimer, the term of this patent is extended or adjusted under 35 U.S.C. 154(b) by 90 days.

(21) Appl. No.: 16/481,212

(22) PCT Filed: Jan. 25, 2018

(86) PCT No.: PCT/IB2018/050446
§ 371 (c)(1),
(2) Date: Jul. 26, 2019

(87) PCT Pub. No.: WO2018/142243
PCT Pub. Date: Aug. 9, 2018

(65) Prior Publication Data
US 2021/0171292 A1    Jun. 10, 2021

(30) Foreign Application Priority Data
Jan. 31, 2017    (CH) .................................... 00109/17

(51) Int. Cl.
*B65G 47/60*     (2006.01)
*B65G 17/20*     (2006.01)
(Continued)

(52) U.S. Cl.
CPC .............. *B65G 47/61* (2013.01); *B65B 69/00* (2013.01); *B65D 29/00* (2013.01); *B65G 15/42* (2013.01); *B65G 17/20* (2013.01); *B65G 47/44* (2013.01)

(58) Field of Classification Search
CPC ........ B65G 47/60; B65G 47/61; B65G 17/20; B65D 29/00
(Continued)

(56) References Cited

U.S. PATENT DOCUMENTS 2,609,082 A    9/1952    Leach
2,643,761 A    6/1953    Wagner et al.
(Continued)

FOREIGN PATENT DOCUMENTS

AT        520412 A1       3/2019
DE     1 175 153 B        7/1964
(Continued)

OTHER PUBLICATIONS

European Patent Office, English language version of the International Search Report, Form PCT/ISA/210 for Int'l Appln PCT/IB2018/050446, dated Jul. 5, 2018 (3 pages).
(Continued)

*Primary Examiner* — Douglas A Hess
(74) *Attorney, Agent, or Firm* — Pauley Erickson & Swanson

(57) ABSTRACT

A device for emptying transport bags conveyed in a suspended manner, includes a conveying system via which transport bags may be supplied in a suspended manner along a conveying path. The transport bags have a pocket that is open at the top when in the filled state and a front side. A circulating conveyor belt for receiving piece good units transported in the transport bags is included, and in a contact section, the conveying paths of the conveying system and the conveyor belt are situated relative to one another in such a way that the distance between the conveying paths of the conveying system and the conveyor belt become continuously smaller, so that when a transport bag is conveyed along the contact section, the front side of the pocket of the (Continued)

transport bag contacts and comes to rest on the conveyor belt, and the transport bag is thereby pivoted backwards.

19 Claims, 7 Drawing Sheets

(51) Int. Cl.
| | | |
|---|---|---|
| *B65G 47/61* | (2006.01) | |
| *B65B 69/00* | (2006.01) | |
| *B65D 30/00* | (2006.01) | |
| *B65G 15/42* | (2006.01) | |
| *B65G 47/44* | (2006.01) | |

(58) Field of Classification Search
USPC .............................................. 198/678.1, 680
See application file for complete search history.

(56) References Cited

U.S. PATENT DOCUMENTS

| | | | |
|---|---|---|---|
| 2,992,721 A | 7/1961 | Eger | |
| 4,144,538 A * | 3/1979 | Chapman | D06B 11/0056 |
| | | | 118/638 |
| 4,318,807 A * | 3/1982 | Maki-Hoimela | B07C 5/14 |
| | | | 209/517 |
| 4,508,484 A | 4/1985 | Heiz | |
| 4,805,780 A * | 2/1989 | Solund | B07C 3/082 |
| | | | 198/370.05 |
| 5,125,500 A | 6/1992 | Cailbault | |
| 5,799,769 A | 9/1998 | Heer et al. | |
| 6,464,067 B1 * | 10/2002 | Reist | B65H 29/003 |
| | | | 198/465.4 |
| 7,080,727 B1 | 7/2006 | Sanderson | |
| 8,151,973 B2 | 4/2012 | Borkiewicz et al. | |
| 8,505,712 B2 * | 8/2013 | Andreae | B65G 47/61 |
| | | | 198/678.1 |
| 8,607,963 B2 * | 12/2013 | Wend | B65G 47/61 |
| | | | 198/430 |
| 9,630,751 B1 * | 4/2017 | Otto | B65D 88/52 |
| 9,815,635 B2 | 11/2017 | Sieksmeier et al. | |
| 10,005,616 B2 | 6/2018 | Fenile et al. | |
| 10,065,800 B2 * | 9/2018 | Auf Der Maur | B65B 67/1238 |
| 10,112,783 B2 | 10/2018 | Stauber | |
| 10,301,121 B1 * | 5/2019 | Hoffman | B65G 47/46 |
| 10,322,887 B2 * | 6/2019 | Fenile | B65G 47/78 |
| 10,358,299 B2 * | 7/2019 | Ruge | B65G 9/002 |
| 10,633,195 B2 * | 4/2020 | Gadliger | B65G 47/57 |
| 10,647,523 B2 * | 5/2020 | Sigrist | B65G 9/002 |
| 10,875,716 B2 * | 12/2020 | Schonenberger | B65G 17/32 |
| 2003/0106774 A1 | 6/2003 | Muller | |
| 2010/0089722 A1 | 4/2010 | Wiedemann et al. | |
| 2012/0037272 A1 | 2/2012 | Wend et al. | |
| 2015/0225177 A1 | 8/2015 | Schönenberger | |
| 2017/0088302 A1 | 3/2017 | Auf Der Maur | |
| 2017/0341864 A1 | 11/2017 | Stauber | |
| 2017/0369248 A1 | 12/2017 | Fenile | |
| 2018/0208407 A1 | 7/2018 | Ruge et al. | |
| 2018/0215547 A1 | 8/2018 | Fenile et al. | |
| 2018/0244471 A1 | 8/2018 | Keller et al. | |
| 2018/0244488 A1 | 8/2018 | Keller et al. | |
| 2018/0312341 A1 * | 11/2018 | Keller et al. | |
| 2018/0354728 A1 | 12/2018 | Sigrist | |
| 2019/0367282 A1 | 12/2019 | Stauber | |
| 2020/0024074 A1 | 1/2020 | Herzog-Lang et al. | |
| 2020/0189846 A1 | 6/2020 | Sutter | |

FOREIGN PATENT DOCUMENTS

| | | |
|---|---|---|
| DE | 195 04 879 A1 | 8/1996 |
| DE | 103 54 419 A1 | 6/2005 |
| DE | 10 2004 018 569 A1 | 11/2005 |
| DE | 10 2008 026 720 A1 | 12/2009 |
| DE | 20 2012 012331 U1 | 1/2013 |
| DE | 10 2012 018925 A1 | 3/2014 |
| DE | 10 2014 203 298 A1 | 8/2015 |
| DE | 20 2017 105 508 U1 | 12/2017 |
| EP | 0 050 245 A1 | 4/1982 |
| EP | 2 130 968 A1 | 12/2009 |
| EP | 2 196 415 A2 | 6/2010 |
| EP | 3 575 246 A1 | 12/2019 |
| GB | 2 232 391 A | 12/1990 |
| JP | S46 11228 Y1 | 4/1971 |
| JP | S52-37381 U | 3/1977 |
| JP | S52-41873 U | 3/1977 |
| JP | S60-176868 U | 11/1985 |
| JP | H04 339744 A | 11/1992 |
| SU | 1 169 904 A1 | 7/1985 |
| WO | WO 90/03853 A2 | 4/1990 |
| WO | WO 2013/053747 A1 | 4/2013 |
| WO | WO 2016/030275 A1 | 3/2016 |
| WO | WO 2017/202491 A1 | 11/2017 |
| WO | WO 2018/078098 A1 | 5/2018 |

OTHER PUBLICATIONS

International Bureau of WIPO, English translation of the Int'l Preliminary Report on Patentability, Form PCT/IB/373, for Int'l Appln PCT/IB2018/050446, dated Aug. 6, 2019 (1 page).
International Bureau of WIPO, English translation of the Written Opinion of the Int'l Searching Authority, Form PCT/ISA/237, dated May 7, 2018 (7 pages).

* cited by examiner

DEVICE FOR EMPTYING TRANSPORT BAGS CONVEYED IN A SUSPENDED MANNER

BACKGROUND OF THE INVENTION

Field of the Invention

The present invention pertains to the field of transport and conveying technology, and relates to a device for emptying transport bags conveyed in a suspended manner.

Discussion of Related Art

In automated warehouses, large production facilities, and in general in the conveying and transport of goods, suspension conveyor systems have proven to be an efficient means for the transport, intermediate buffer storage, and long-term storage of various types of goods. In suspension conveyor systems, the goods are either suitably suspended directly on individual conveying elements of a conveying system, or introduced into appropriate transport elements such as transport bags, which in turn are mounted in a suspended manner on the conveying elements.

Suspension conveyor systems may be implemented as transport chain facilities in which a plurality of conveying elements form links in a chain that is moved along a conveying path.

Also known are gravity-driven conveying systems in which individual conveying elements equipped with wheels move on corresponding rails. One example of such a gravity-driven, rail-guided conveying system is known from WO 2016/030275 A1 by the present applicant.

Suspension conveyor systems with transport elements are particularly suited for efficiently conveying heterogeneous piece good articles, for example workpieces in production processes, replacement parts, and consumer goods such as books, clothing, shoes, etc.

Thus, for example, suspension conveyor systems may be used in logistics centers of mail order companies for storing a plurality of articles of various sizes and weights, and for picking groups of articles according to the particular customer orders and providing them for shipment.

In this regard, one relevant aspect for a suspension conveyor system is simple, smooth, and efficient introduction of goods into empty transport elements and removing the goods from the transport elements.

Manual removal of the goods from the transport bags allows flexible handling of various goods, but is slow and costly.

There is a general need for improvements in this field of technology.

SUMMARY OF THE INVENTION

It is an object of the invention to provide a device for emptying transport bags that are conveyed in a suspended manner, which allows simple and efficient emptying of the transport bags.

This and other objects are achieved by a device according to the invention according to the independent claim. Further preferred embodiments are set forth in the dependent claims.

A device according to the invention for emptying transport bags conveyed in a suspended manner comprises a conveying system, in particular a rail-guided conveying system or a conveyor chain system, via which transport bags may be supplied in a suspended manner along a conveying path, the transport bags having a pocket that is open at the top when in the filled state, with a front side. The device further comprises a circulating conveyor belt for receiving piece good units transported in the transport bags. In a contact section, the conveying path of the conveying system and the conveying path of the conveyor belt are situated relative to one another in such a way that the distance between the conveying path of the conveying system and the conveying path of the conveyor belt becomes continuously or increasingly smaller, so that when a transport bag is conveyed along the contact section, the front side of the pocket of the transport bag contacts and comes to rest on the conveyor belt, and the transport bag is thereby swiveled or pivoted backwards.

The transport bags may be pivotably suspended on conveying elements of the conveying system.

Within the meaning of the present description, transport bags may be understood to mean any transport element that can be used within the meaning of the technical principle of the device according to the invention described below, for example transport boxes having stable walls, or lightweight rod assemblies with textile walls stretched in between, etc.

In such a device, the conveying path of the conveying system and the conveying path of the conveyor belt advantageously run essentially parallel to one another with a certain downward slope in a transfer section. During the conveying, the front side of the pocket of a transport bag continues to lie along the transfer section on the conveyor belt, so that the opening in the pocket of the transport bag is oriented obliquely downwardly, and piece good units that are present in the pocket of the transport bag, driven by gravity, slide from the pocket onto the conveyor belt.

The transfer section may adjoin the contact section and/or may partially overlap the contact section.

It is particularly advantageous that in the above-mentioned device, in a separating section the distance between the conveying path of the conveying system and the conveying path of the conveyor belt becomes continuously larger, so that during the conveying of a transport bag along the separating section, the emptied transport bag is lifted from the conveyor belt and swivels back into the freely suspended position.

The separating section may adjoin the transfer section and/or may partially overlap the transfer section.

In the above-mentioned devices, the conveying speeds of the conveyor belt and of the conveying system are advantageously the same.

The conveyor belt of the device advantageously has a plurality of outwardly directed transversal ribs that are uniformly spaced along the circumference of the conveyor belt.

In such a device, the position of the ribs and of the transport bags relative to one another is selected in such a way that in the contact section a rib catches up with the transport bag, contacts the base section of the transport bag, and pushes it forward in the conveying direction until the transport bag is transferred into a state for emptying.

The distance between the ribs is advantageously selected in such a way that during the conveying of a transport bag along the transfer section, piece good units that are present in the pocket of the transport bag, driven by gravity, slide from the pocket onto the conveyor belt, and slide further downwardly on the conveyor belt with assistance from gravity until they are intercepted and held by the rib preceding the transport bag.

In the above-mentioned devices, the ribs of the conveyor belt are advantageously made up of a plurality of parallel fingers.

Such a device particularly advantageously includes a chute that adjoins the conveyor belt, wherein an upper end of the chute has slots whose positions correspond to the fingers of the ribs of the conveyor belt, so that when the conveyor belt is deflected, the fingers of the ribs and the slots of the chute intermesh with one another, and in each case piece good units held back behind a rib are released in a clocked manner and, driven by gravity, are subsequently further conveyed on the chute.

Such a device advantageously has a further conveyor that receives the released piece good units from the chute.

In the above-mentioned devices, vibration means are advantageously provided, via which the surface of the conveyor belt may be set in vibration or oscillation, at least in a partial section of the conveyor belt.

Such vibrations or oscillations may assist gravity in freeing possibly jammed goods from the pocket of the transport bag, and/or may assist with the sliding of the goods on the conveyor belt to the next underlying rib.

The transport bags of one of the above-mentioned devices advantageously have a reinforced rear wall.

The transport bags of one of the above-mentioned devices advantageously include a rear wall and a front wall that are flexibly joined together via a base section in such a way that they are movable back and forth between a first state in which they form a pocket that is open and fillable at the top, and a second state in which they are situated close together and form a folded-up bag.

The rear wall of the transport bag is particularly advantageously extended upwardly beyond the level of the front wall, with a support section for fastening the transport bag to the conveying element.

BRIEF DESCRIPTION OF SEVERAL VIEWS OF THE DRAWINGS

Reference is made below to the drawings for better understanding of the present invention. The drawings show embodiments of the inventive subject matter strictly by way of example.

Identical or functionally equivalent parts in the figures and the associated description are provided with the same reference numerals.

DETAILED DESCRIPTION OF THE INVENTION

Figure 1A:
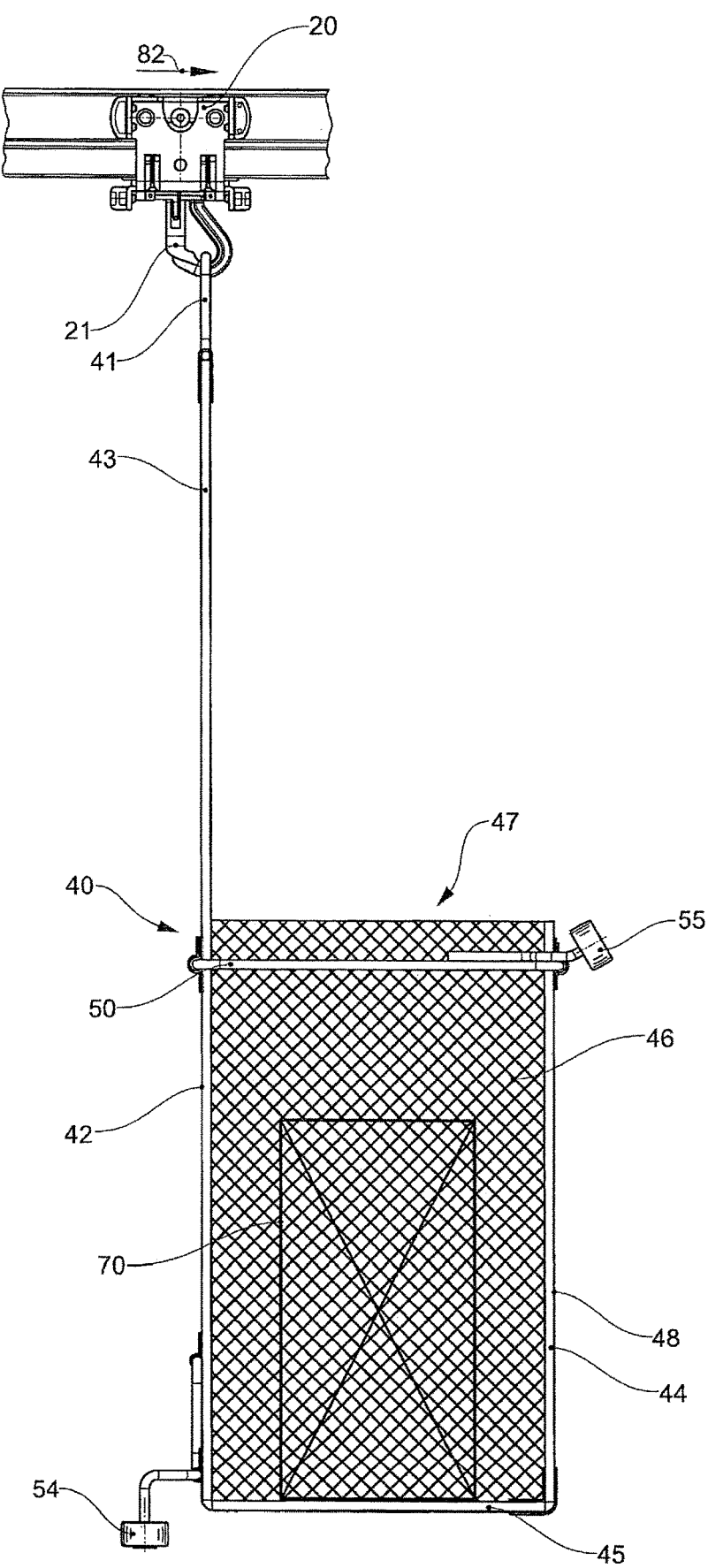
FIG. 1 schematically shows a disclosed conveying unit of a conveying system, having a transport bag transverse to the conveying direction, filled with a piece good unit, (a) in a side view of the transport bag with the conveying direction toward the right; (b) in an oblique view of the transport bag from the rear; and (c) in a rear view of the transport bag, looking in the conveying direction.
Figure 1B:
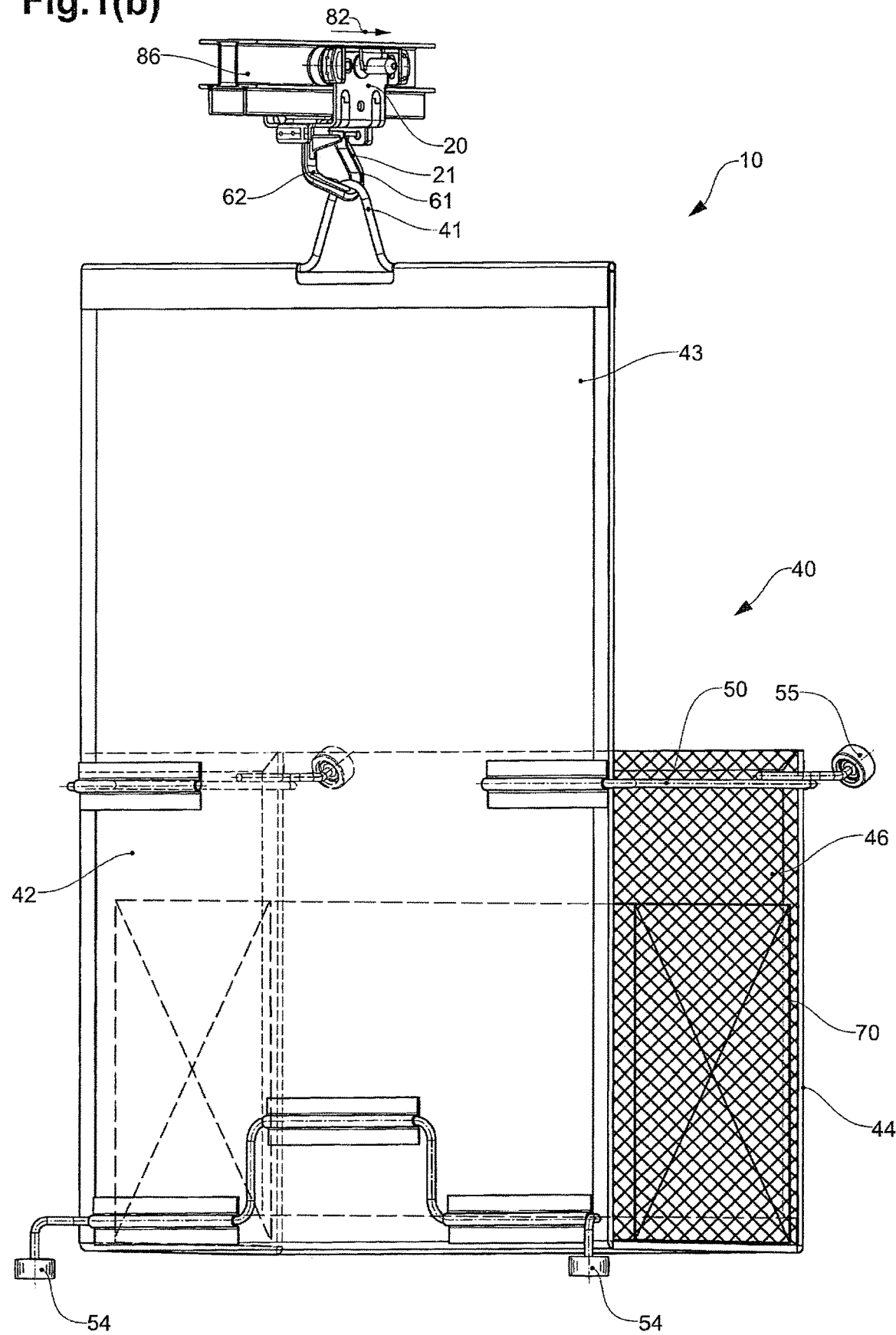
Figure 1C:
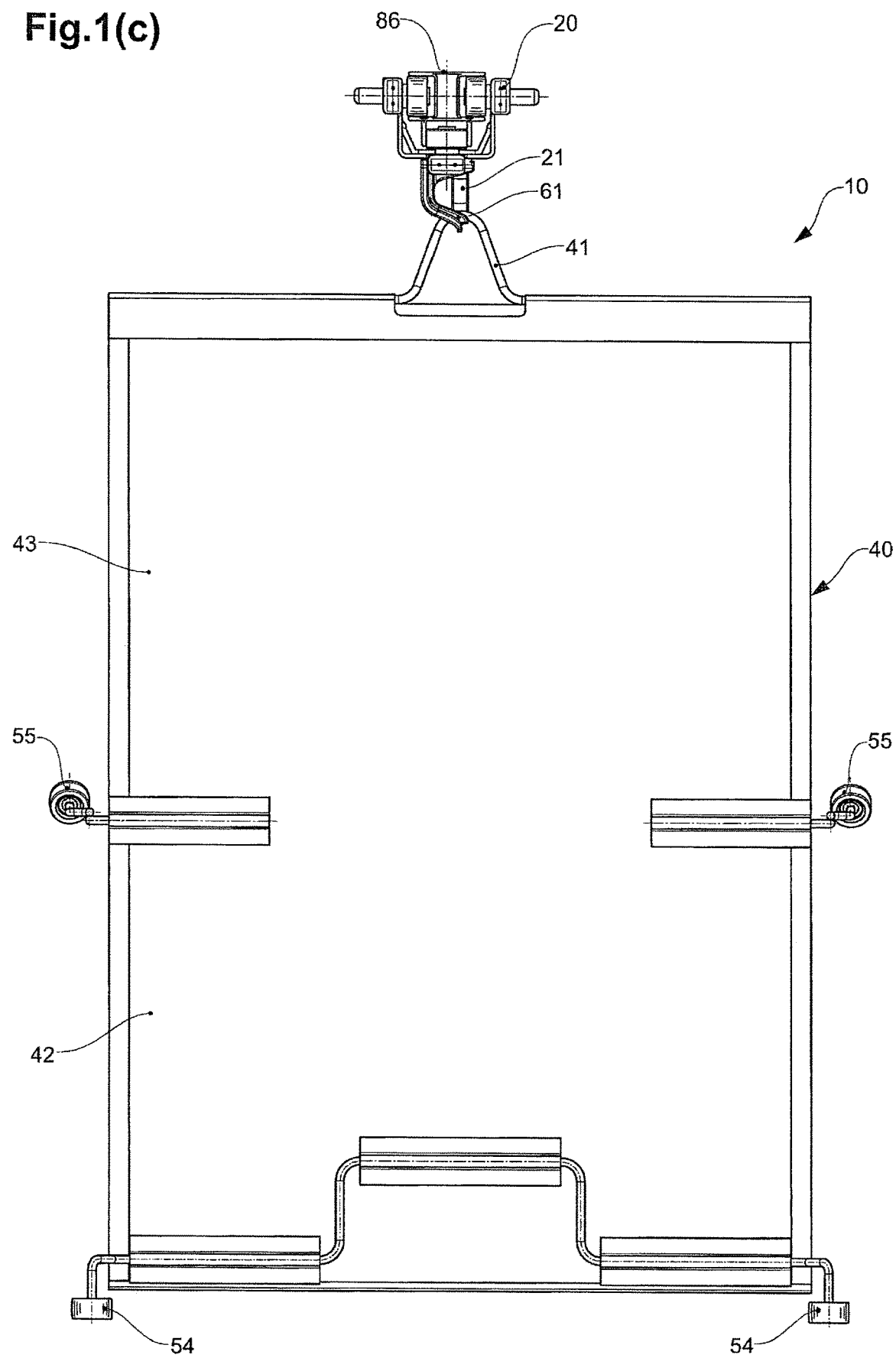

A conveying unit 10 that may be used in a device according to the invention for emptying transport bags conveyed in a suspended manner is illustrated in FIG. 1. A transport element 40 in the form of a transport bag has a suspension hook 41 that is suspended in a support hook 21 of a conveying element 20. In the example shown, the conveying element is a trolley or carriage of a gravity-driven suspension conveyor facility, analogous to a suspension conveyor facility as disclosed, for example, in WO 2016/030275 A1 by the present applicant. For better understanding, the carriage 20 is illustrated on a rail 86 of a conveying system, where it moves in an intended conveying direction 82.

The transport bag includes a front wall 44, a base section 45, and a rear wall 42 that are pivotably connected at the abutting edges. The front wall, rear wall, and base section have a stable design, and may be made, for example, of a suitable plastic material such as a hollow profile panel. Flexibly designed side walls 46 connect the front wall, rear wall, and base section, resulting in a pocket 47 with an opening into which at least one piece good unit 70 may be loaded. In the example shown, the side walls are made of a fine-mesh net. It is also possible to use a flexible textile material. The side walls 46 are designed in such a way that when the transport bag is folded up, they are likewise folded up, as described below.

A pivotably fastened spacer 50 in the form of a wire bracket is situated on each side, between the front wall 44 and the rear wall 42. The spacers 50 are situated essentially parallel to the base section 45 and have the same length as the base section, and the front wall 44 is situated essentially parallel to the rear wall 42, so that the rear wall 42, spacer 50, front wall 44, and base section 45 form a parallelogram.

In the unloaded state, the weight of the front wall and the base section may drop the front wall downwardly, so that the transport bag goes into a second state in which the front wall and the rear wall are close to one another.

In this configuration the transport bag may be kept in a conveying system in a space-saving manner by lining up the conveying units flush on a rail, one behind the other.

The transport bag may be transferred from the second, folded-up state into a first, unfolded state by raising the front wall 44 and/or the base section 45 with respect to the rear wall 42, as shown in FIG. 1. The upwardly directed opening in the pocket 47 of the transport bag 40 is now in a read-to-fill state.

In the exemplary embodiment shown, a piece good unit, schematically illustrated by a cuboidal object 70, is situated in the pocket 47 of the transport bag 40.

Two guide rollers 54 are situated at a lower end of the rear wall 42. The guide rollers may be used to additionally move the transport bag 40 during the conveying in a conveying system when the transport bag is being displaced along the conveying direction 82, for example by guiding one or both guide rollers in a connecting link. Similarly, the two guide rollers 55 mounted at an upper end of the front wall 44 may be used to raise the front wall 42.

The rear wall 42 at its upper end is extended into a support section 43, at the upper end of which the suspension hook 41 in the form of a wire bracket is pivotably connected to the rear wall 42 or the support section 43 thereof. The bracket of the suspension hook 41 defines an orientation plane of the suspension hook, and thus, of the entire transport bag.

The support hook 21 is mounted on a lower end of the carriage 20 facing away from the rail 86. The support hook may be made of metal or a suitable polymer material, for example a glass fiber-reinforced thermoplastic material. In the illustration in FIG. 1, the suspension hook 41 is in a stable position in which the suspension hook is supported where the potential energy is at a minimum. In this stable position, the suspension hook 41 is oriented in a plane transverse to the conveying direction 82, and a front side 48 of the pocket of the transport bag faces in the conveying direction 82.

One possible embodiment of a device 110 according to the invention for emptying transport bags 40 conveyed in a suspended manner is illustrated in FIG. 2, in four different phases (a), (b), (c), (d) of the continuous overall process. The various procedures during operation of the device are explained below. The device 110 allows the automated emptying of transport bags 40 during continuous operation, as well as the clocked relaying of the removed piece goods 70 for further processing.

The illustrated emptying device 110 is part of a conveying system 80 for the suspended conveying of transport bags 40. Such a conveying system may be designed as a transport chain conveyor or as a gravity-driven suspension conveyor facility. In terms of function, this is not relevant for the device 110 according to the invention, since in any case, the individual conveying units 10 together with the transport bags 40 are forcibly conveyed at a specified constant speed in the area of the emptying device 110. In the case of a gravity-driven suspension conveyor facility, this takes place by means of a conveyor chain system (not illustrated) which runs parallel to the rail 86 and carries the individual carriages 20 together with the transport bags 40 along the conveying path of the conveying system 80.

The conveying path of the conveying system 80 runs from right to left in the conveying direction 82. A conveyor belt 120 that circulates in the counterclockwise direction and whose tangential conveying speed is the same as the conveying speed of the conveying system 80 is situated below the conveying system. Transversal ribs 122 are situated on the conveyor belt 120 at regular intervals along the circumference.

In a first step, a supplied transport bag 40 is placed on the conveyor belt 120 and transferred into a state in which the goods may be removed from the pocket. A filled transport bag 40, T1 is supplied from the right (FIGS. 2(c), (d)). The front wall of the pocket is pulled downwardly by the intrinsic weight of the front wall, the base section, and the piece good, so that the distance between the rear wall and the front wall is minimal within the scope defined by the piece good.

Figure 2A:
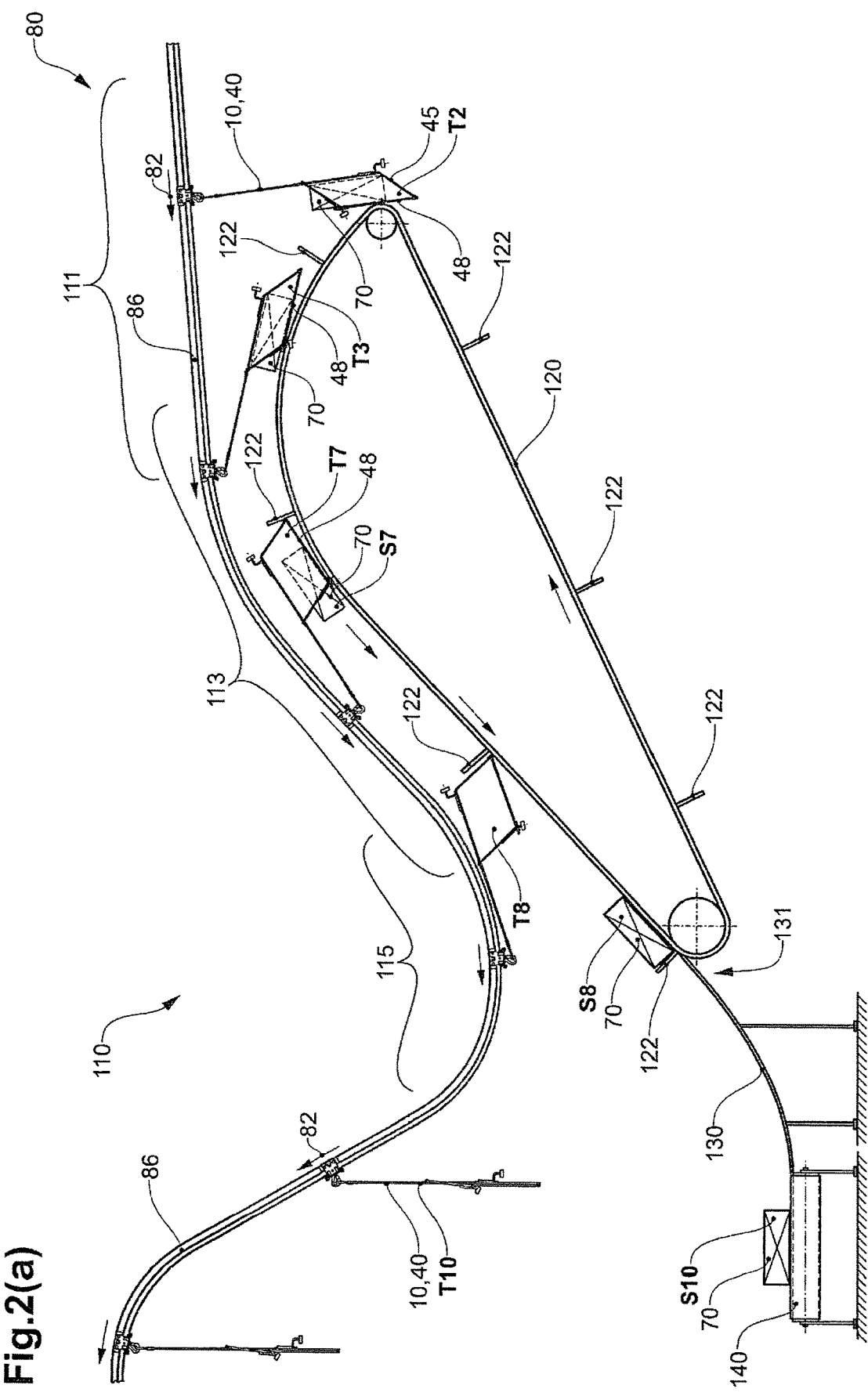
FIG. 2 schematically shows one possible embodiment of a device according to the invention for emptying transport bags conveyed in a suspended manner, in successive phases (a), (b), (c), (d) of a partial cycle.
Figure 2B:
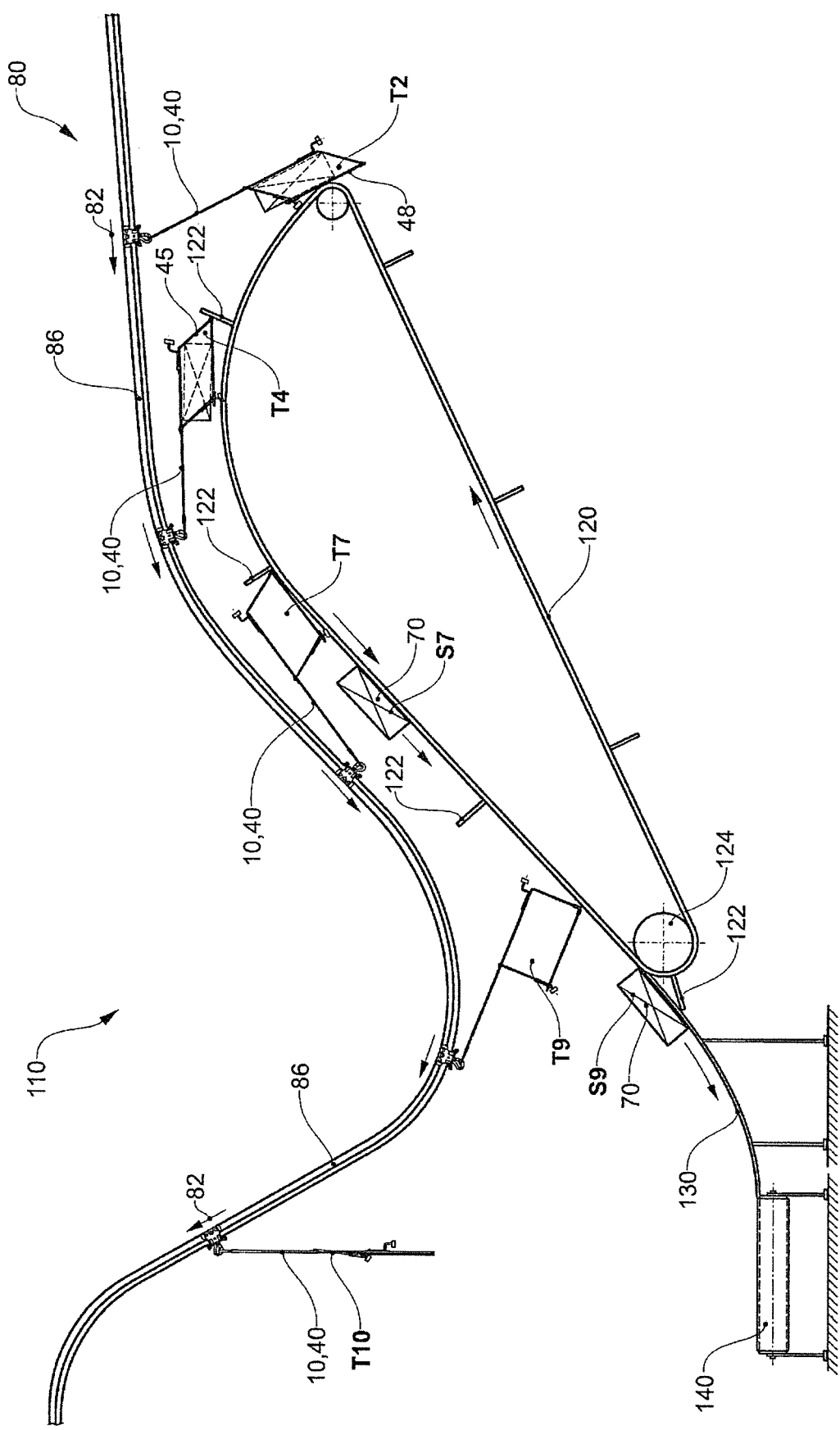

The front side 48 of the pocket 40, T2, namely, the front wall 44, ultimately meets the circulating conveyor belt 120 (FIGS. 2(a), (b)), and is swiveled to the rear in relation to the conveying direction 82. This marks the beginning of a contact section 111 of the device 110.

The conveyor belt 120 in this section has an inclination that becomes increasingly flatter, while the rail of the conveying system 80 has a constant slope to the left. This results in a smaller horizontal speed component for the conveyor belt than for the conveying system. Lastly, toward the end of the contact section 111 the conveying path of the conveyor belt 120 and the conveying path of the conveying system 80 run essentially parallel, and the horizontal speed components have adapted to one another.

It is noted that the absolute speeds of the conveyor belt and the conveying system are the same and do not change. Only the horizontal speed components differ at the various positions along the conveying path.

The distances between the transversal ribs 122 essentially correspond to the distances between the carriages 20 on the conveying system 80. The relative phase shift of the ribs 122 in relation to the carriages 20 is selected in such a way that a rib in the contact section runs behind the transport bag 40, T3 (FIGS. 2(c), (d), (a)), and slowly catches up with the transport bag 40 until the rib ultimately reaches the base section 45 of the transport bag 40, T4 (FIG. 2(b)). In this area, the rib moves more quickly horizontally than does the transport bag, whose carriage has already reached an area of an increasing slope. The rib 122 now pushes the base section 45 of the pocket 40, T5 forward (FIG. 2(c)), so that the distance between the front wall 44 and the rear wall 42 is increased, and at the end of the contact section 111 the transport bag 40 ultimately assumes a state in which the transport bag 40, T6 is open to the maximum extent and may be emptied (FIG. 2(d)). This marks the end of the contact section 111 and the beginning of the transfer section 113 of the device 110.

In the transfer section 113, the conveying paths of the conveying system 80 and of the conveyor belt 120 run parallel to one another with a certain slope. The conveying system 80 and the conveyor belt 120 have identical horizontal and vertical speed components. A piece good unit 70, S6, S7 present in the transport bag begins to slide out of the transport bag 40, T6, T7 and beneath the conveyor belt 120 (FIGS. 2(d), (a), (b), (c)), until ultimately the piece good unit 70, S8 reaches the transversal rib 122 traveling in front, and is stopped by same (FIGS. 2(d), (a)).

Figure 2C:
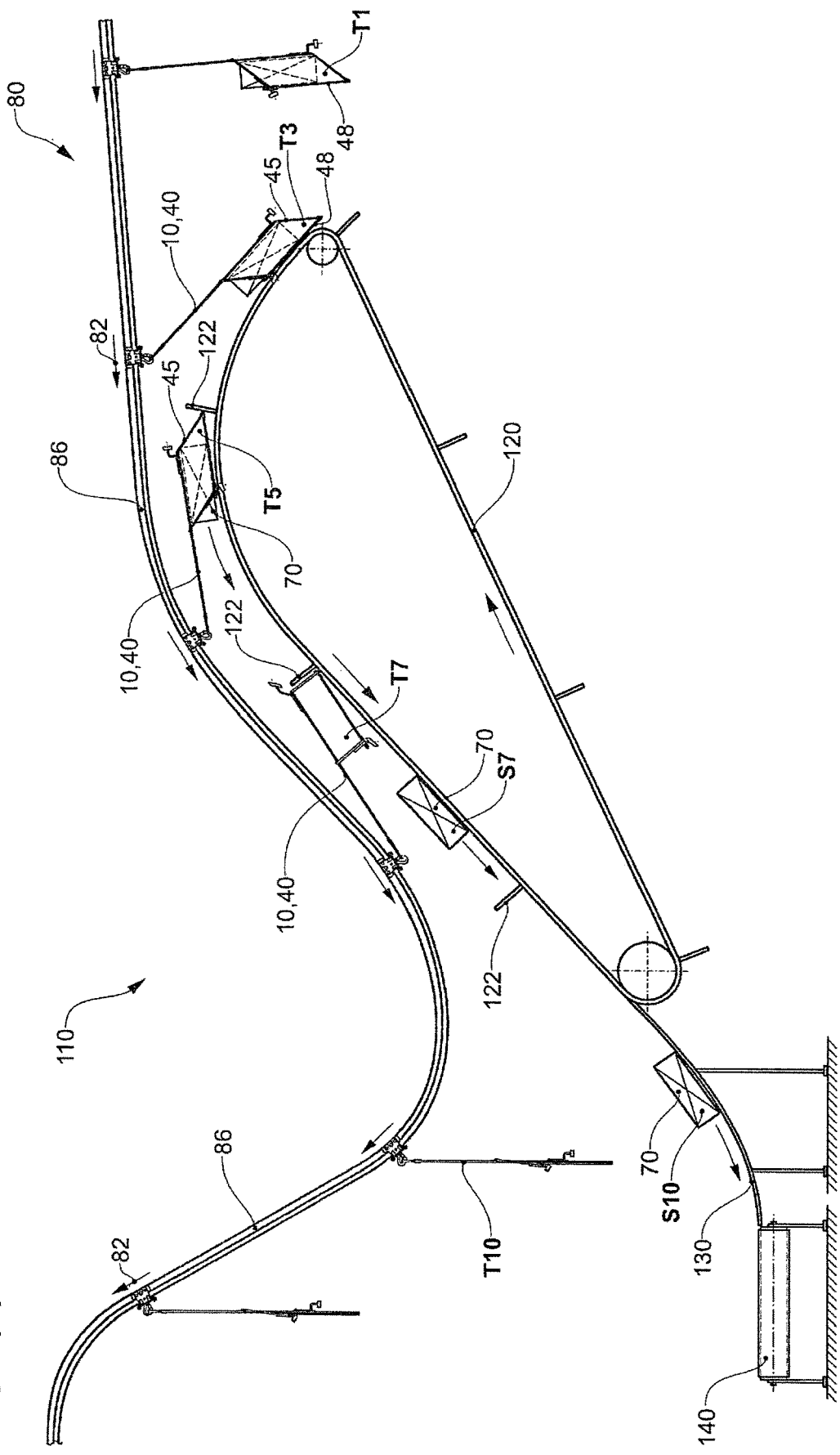
Figure 2D:
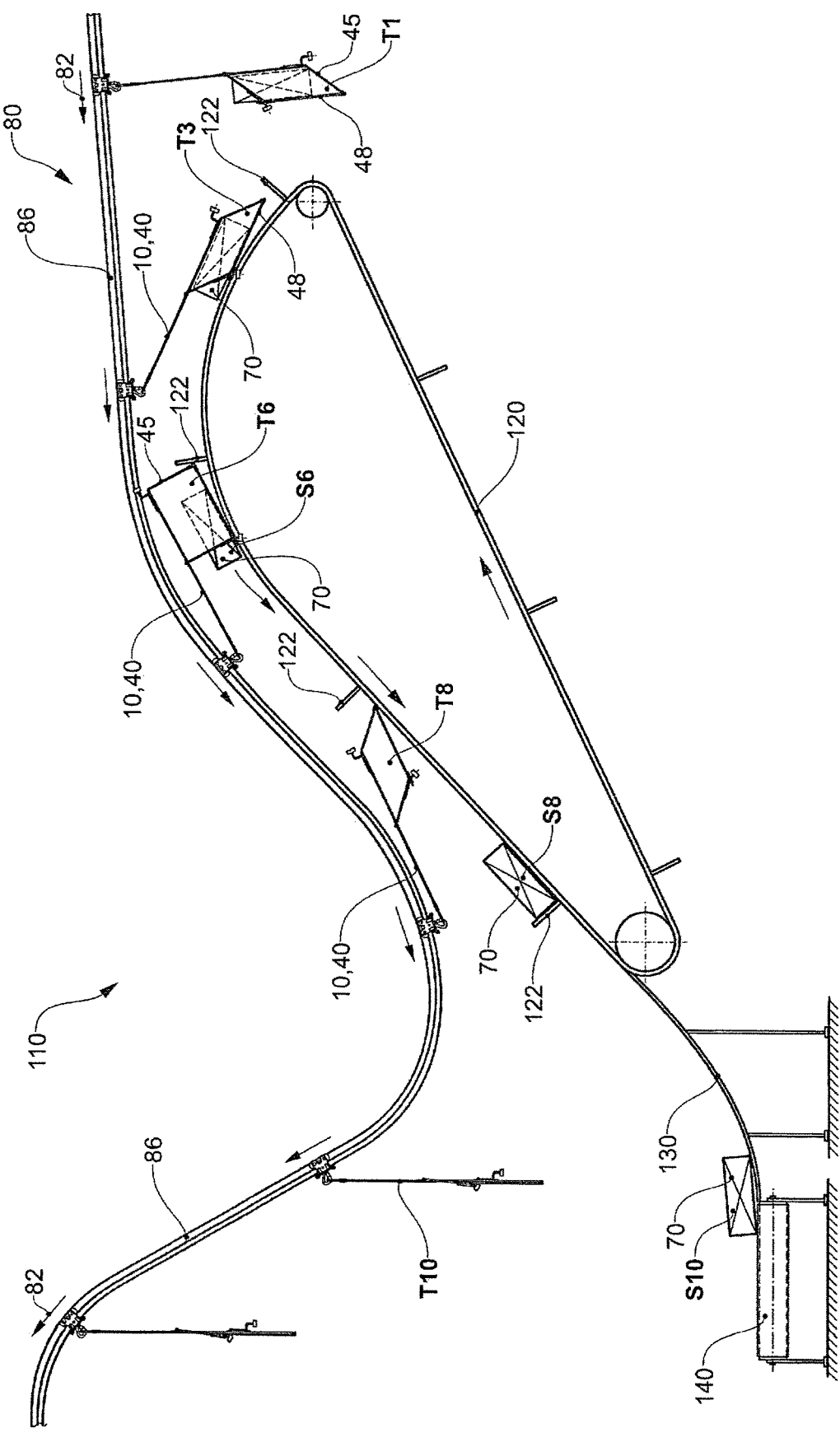

Meanwhile, the emptied transport bag 40, T7, T8 is once again lifted slowly from the conveyor belt 120, since the conveying path of the conveying system swivels upwardly away from the conveying path of the conveyor belt 120 (FIGS. 2(c), (d), (a)). This marks the end of the transfer section 113 and the beginning of the separating section 115 of the device 110. Lastly, the empty transport bag 40, T9 is lifted from the conveyor belt 120 (FIG. 2(b)). The empty transport bag 40, T10 now swivels back into the freely suspended position, and is carried away upwardly and to the left (FIGS. 2(c), (d), (a), (b)) for reuse in the conveying system 80.

Meanwhile, the transversal rib together with the piece good unit 70, S8 resting thereon reaches the end of the conveyor belt 120 (FIG. 2(a)).

The transversal ribs 120 are advantageously made up of a plurality of outwardly protruding fingers (not visible in FIG. 2) which run through corresponding slots (not visible) in a chute 130 directly adjoining the conveyor line. In this way, the piece good units 70, S9 are transferred to the chute 130 in a clocked manner as soon as the fingers of the ribs 120 are swiveled through the slots in the chute 130 upon reaching the deflection roller 124, and no longer hold back the piece good (FIG. 2(b)).

The piece good unit 70, S10, driven by gravity, slides beneath the chute 130 and ultimately lands on a further conveyor (FIGS. 2(c), (d), (a)), in the example shown, a conveyor belt 140 that carries the piece good away, transverse to the chute, for further processing.

The device shown has the particular advantage that the automatic emptying of the transport bags takes place continuously. Another advantage is the option for further processing of the removed piece good units in a clocked manner.

The scope of the present invention is not limited to the specific embodiments described herein. Rather, the description and the associated figures, in addition to the examples disclosed herein, result in various further modifications of the present invention for those skilled in the art, which likewise are encompassed by the protective scope of the claims. Furthermore, various references are cited in the description, the disclosed content of which is hereby fully incorporated by reference into the description.

The invention claimed is:

1. A device for emptying transport bags conveyed in a suspended manner, the device comprising;
    a conveying system via which transport bags may be supplied in a suspended manner along a conveying path, the transport bags having a pocket that is open at the top when in the filled state and having a front side;
    a circulating conveyor belt for receiving piece good units transported in the transport bags, wherein in a contact section, the conveying path of the conveying system and the conveying path of the conveyor belt are situated relative to one another in such a way that the distance between the conveying path of the conveying system and the conveying path of the conveyor belt becomes continuously smaller, so that when a transport bag is conveyed along the contact section, the front side of the pocket of the transport bag contacts and comes to rest on the conveyor belt, and the transport bag is thereby pivoted backwards;
    wherein in a transfer section the conveying path of the conveying system and the conveying path of the conveyor belt run downwardly in parallel to one another with a certain slope, and
    wherein during the conveying along the transfer section, the front side of the pocket of a transport bag continues to lie on the conveyor belt, such that the opening of the pocket of the transport bag is oriented obliquely downwardly, and piece good units that are present in the pocket of the transport bag, driven by gravity, slide from the pocket onto the conveyor belt.

2. The device according to claim 1, wherein in a separating section the distance between the conveying path of the conveying system and the conveying path of the conveyor belt becomes continuously larger, so that during the conveying of a transport bag along the separating section, the emptied transport bag is lifted from the conveyor belt and swivels back into the freely suspended position.

3. The device according to claim 1, wherein the conveying speeds of the conveyor belt and of the conveying system are the same.

4. The device according to claim 1, wherein the conveyor belt has a plurality of outwardly directed transversal ribs that are uniformly spaced along the circumference of the conveyor belt.

5. The device according to claim 4, wherein a position of the ribs and of the transport bags relative to one another is selected in such a way that in the contact section a rib catches up with the transport bag, contacts the base section of the transport bag, and pushes it forward in a conveying direction until the transport bag is transferred into a state for emptying.

6. The device according to claim 4, wherein a distance between the ribs is selected in such a way that during the conveying of a transport bag along the transfer section, piece good units that are present in the pocket of the transport bag, driven by gravity, slide from the pocket onto the conveyor belt, and slide further downwardly on the conveyor belt with assistance from gravity until they are intercepted and held by the rib preceding the transport bag.

7. The device according to claims 4, wherein the ribs of the conveyor belt are made up of a plurality of parallel fingers.

8. The device according to claim 7, having a chute that adjoins the conveyor belt, wherein an upper end of the chute has slots whose positions correspond to the fingers of the ribs of the conveyor belt, so that when the conveyor belt is deflected, the fingers of the ribs and the slots of the chute intermesh with one another, and in each case piece good units held back behind a rib are released in a clocked manner and, driven by gravity, are subsequently further conveyed on the chute.

9. The device according to claim 8, having a further conveyor that receives the released piece good units from the chute.

10. The device according to claim 1, wherein vibration means are provided, via which the surface of the conveyor belt may be set in vibration or oscillation, at least in a partial section of the conveyor belt.

11. The device according to claim 1, wherein the transport bags have a reinforced rear wall.

12. The device according to claim 1, wherein the transport bags include a rear wall and a front wall that are flexibly joined together via a base section in such a way that they are movable back and forth between a first state in which they form a pocket that is open and fillable at the top, and a second state in which they are situated close together and form a folded-up bag.

13. The device according to claim 12, wherein the rear wall is extended upwardly beyond a level of the front wall, with a support section for fastening the transport bag to the conveying element.

14. A method for emptying transport bags conveyed in a suspended manner, the method comprising;
    providing a conveying system via which transport bags may be supplied in a suspended manner along a conveying path;
    providing a pocket in the transport bags that is open at the top when in the filled state and having a front side;
    providing a circulating conveyor belt for receiving piece good units transported in the transport bags, wherein in a contact section, the conveying path of the conveying system and the conveying path of the conveyor belt are situated relative to one another in such a way that the distance between the conveying path of the conveying system and the conveying path of the conveyor belt becomes continuously smaller, so that when a transport bag is conveyed along the contact section, the front side of the pocket of the transport bag contacts and comes to rest on the conveyor belt, and the transport bag is thereby pivoted backwards.

15. The method according to claim 14, further comprising operating the conveyor belt and the conveying system at the same conveying speed.

16. The method according to claim 14, wherein in the contact section a rib of the conveyor belt catches up with a transport bag, contacts the base section of the transport bag, and pushes it forward in the conveying direction until the transport bag is transferred into a state for emptying.

17. The method according to claim 14, wherein the provided conveyor belt includes a plurality of outwardly directed transversal ribs that are uniformly spaced along the circumference of the conveyor belt; and wherein a distance between the ribs is selected in such a way that during the conveying of a transport bag along a transfer section, piece good units that are present in the pocket of the transport bag, driven by gravity, slide from the pocket onto the conveyor belt, and slide further downwardly on the conveyor belt with assistance from gravity until they are intercepted and held by the rib preceding the transport bag; and
    wherein in the transfer section a rib of the conveyor belt preceding said transport bag intercepts and holds any piece good units that are sliding gravity driven out from the pocket of the transport bag downward on the conveyor belt in the transfer section.

18. The method according to claim 14, further comprising releasing piece good units held back behind the rib of the conveyor belt in a clocked manner onto a chute adjoining the conveyor belt.

19. The method according to claim 14, further comprising vibrating or oscillating at least a partial section of the conveyor belt.

* * * * *